United States Patent
Ma et al.

(10) Patent No.: US 7,930,135 B2
(45) Date of Patent: Apr. 19, 2011

(54) METHOD OF DISTINGUISHING RUNNING FROM WALKING

(75) Inventors: Chor-Tin Ma, Kowloon (HK); Kai-Kin Chan, Kowloon (HK)

(73) Assignee: Perception Digital Limited, Hong Kong SAR (CN)

( * ) Notice: Subject to any disclaimer, the term of this patent is extended or adjusted under 35 U.S.C. 154(b) by 43 days.

(21) Appl. No.: 12/342,678

(22) Filed: Dec. 23, 2008

(65) Prior Publication Data

US 2010/0010774 A1 Jan. 14, 2010

(30) Foreign Application Priority Data

Aug. 18, 2008 (CN) .......................... 2008 1 0142396
Aug. 19, 2008 (CN) .......................... 2008 1 0142474

(51) Int. Cl.
*G01C 22/00* (2006.01)

(52) U.S. Cl. ...................................................... 702/160
(58) Field of Classification Search .................. 702/160
See application file for complete search history.

(56) References Cited

U.S. PATENT DOCUMENTS

| | | | |
|---|---|---|---|
| 6,145,389 A * | 11/2000 | Ebeling et al. | ............... 73/865.4 |
| 6,386,041 B1 | 5/2002 | Yang | |
| 6,853,955 B1 | 2/2005 | Burrell et al. | |
| 7,376,533 B2 | 5/2008 | Fujiwara | |

\* cited by examiner

*Primary Examiner* — Tung S Lau
(74) *Attorney, Agent, or Firm* — Leydig, Voit & Mayer, Ltd.

(57) ABSTRACT

A person's exercise monitored using an accelerometer to detect and count the steps of the person. Furthermore, acceleration profiling distinguishes walking from running and total distance covered in the exercise is estimated using different stride lengths for walking and running. The person's pace may be maintained using a music playback unit with an adjustable rate of playback to influence the pace of the person with the music tempo.

5 Claims, 11 Drawing Sheets

METHOD OF DISTINGUISHING RUNNING FROM WALKING

FIELD OF THE INVENTION

The present invention relates to a method and apparatus for monitoring physical exercise. More specifically, the invention relates to monitoring the steps and pace of a person walking or running.

BACKGROUND OF THE INVENTION

Electronic devices have been designed to assist and evaluate the effectiveness of physical exercise. One common device known as a pedometer counts the steps made by a user during an exercise such as running, jogging or walking. A pedometer may be worn on the user's waist or carried his pocket, and contains an accelerometer to detect variations in vertical acceleration experienced by the user, by which his steps are counted. The accelerations are roughly periodic, with the periods corresponding to the frequency of steps. The pedometer may be calibrated to the length of his stride, by dividing a specific distance by the number of steps taken to cover the distance. Subsequently, distance traveled by the user may be estimated by multiplying the number of steps by the user's stride length.

Some other devices have similar or complementary functions. U.S. Pat. No. 6,386,041 discloses a step counting device which has a ceramic vibration-detecting device, which is installed into a shoe to count the user's steps by counting the presses of the shoe against the ground. U.S. Pat. No. 6,853,955 describes a device which uses Global Positioning System (GPS) to determine the distance covered by the user on foot. However, the device is only suitable for outdoor use. U.S. Pat. No. 7,376,533 discloses a device having an acceleration sensor and a slant sensor, which can distinguish walking movements from non-walking movements if both the acceleration sensor and slant sensor detect a signal.

None of the above described devices and methods are able to distinguish between variations of exercise on foot, i.e. distinguishing running or jogging from walking. Furthermore, none of the devices and methods addresses the possibility that a user may alternate between running and walking during an exercise. Accordingly, there is a general assumption that the user moves with a constant stride length, regardless of whether he is running, jogging or walking. Thus, none of the devices and methods is able to accurately evaluate the effectiveness of an exercise on foot if the user changes pace in the exercise.

Therefore, there is a need for a method and/or device which can determine whether a person is running or walking during an exercise. Furthermore, it is desirable to provide an improved method for estimating the distanced covered by a person who alternates between running and walking.

SUMMARY OF THE INVENTION

Accordingly, in a first aspect, the invention proposes a method of estimating distance covered by a person on foot in a walk comprising: providing an accelerometer to monitoring the acceleration profile of a person moving on foot over a period of time, providing the person's step pace when he makes a walking step, identifying walking steps from running steps in the acceleration profile, counting the number of walking steps in the profile, multiplying the number of walking steps with the length of the person's step pace to obtain the distanced covered by walking in the period of time.

In a second aspect, the invention proposes a method of estimating distance covered by a person on foot in a run comprising: providing an accelerometer to monitoring the acceleration profile of a person moving on foot over a period of time, providing the person's stride distance when he makes a running step, identifying walking steps from running steps in the acceleration profile, counting the number of running steps in the profile, multiplying the number of running steps with the person's stride distance to obtain the distanced covered by running in the period of time.

Therefore, it is possible to identify and evaluate the amount of walking in an exercise of a person, to estimate the distance covered by walking. It is also possible to evaluate the amount of running to the same exercise and estimate the distance covered by running.

In a third aspect, the invention proposes a method of distinguishing running from walking comprising the step of detecting fluctuating accelerations experienced by a person moving on foot the fluctuating accelerations corresponding to the steps of the person, measuring the peaks of the fluctuating acceleration, wherein a peak greater than a particular value A1 and smaller than a particular value A2 indicates a step taken in a walk and wherein a peak greater than A2 indicates a step taken in a run.

Advantageously, the separate contributions of walking and running to an exercise routine may be identified and evaluated separately. Furthermore, as the stride walk and the stride of a run are different, the total distance covered in an exercise in which the person alternates between running and walking may be estimated more accurately. Furthermore, it is possible to reduce error in distance estimation by making it possible to disregard periods of rest.

In a fourth aspect, the invention proposes a method of distinguishing running from walking, comprising: detecting fluctuating accelerations experienced by a person moving on foot, the fluctuating accelerations corresponding to the steps of the person, identifying of moments of free-fall in the fluctuating accelerations, wherein a free-fall moment in any period of fluctuating acceleration indicates a step made in running and any period of fluctuating acceleration having no free-fall moment indicates step made in walking.

Preferably, this is indicated by an acceleration of <A3 (0 g<A3<1 g, in an implementation A3=0.5 g) if the accelerometer is adjusted to output a value of 0 g in a freefall.

In a fifth aspect, the invention proposes a method of identifying accelerations caused by a person taking a step, comprising providing an accelerometer to monitoring the acceleration profile of a person moving on foot over a period of time $M_2$ to $M_3$, and defining the period by sub-periods wherein a first sub-period is defined from a time $M_1$ to a time $M_{1a}$, wherein $M_1$ is the time when the acceleration value begins to increase from a value of x and $M_2$ is the time when the acceleration value decreases back to the value of x, a second sub-period is defined from the time $M_1$ to a time $M_2$, wherein $M_2$ is the time when the acceleration value decreases further to a value of y, and value x is greater than value y, a third sub-period defined from the time $M_2$ to a time $M_3$, wherein $M_2$ is also the time when the acceleration value decreases from value of y, and wherein $M_3$ is the time when the acceleration increases back to the value of y, and determining that the acceleration profile represents a step if the period $M_1$ to $M_3$ has a duration of 120 to 1300 ms, the first sub-period $M_1$ to $M_{1a}$ has a duration of 24 to 600 ms, the second sub-period $M_1$ to $M_2$ has a duration of 80 to 700 ms, and the third sub-period $M_2$ to a time $M_3$ has a duration of 24 to 600 ms.

In a sixth aspect, the invention proposes a method of determining whether a person has made a step, comprising determining the direction of the composite vector of the acceleration vectors in 3 dimensional space; wherein the direction of the composite vector indicates that the person has made a step if the direction of the composite vector is generally in line with the direction of gravity.

Advantageously, it is possible to distinguish movements caused by making steps in a run or a walk from movements of the accelerometer caused by unwanted movements or impacts, such as jerking of the accelerometer in the pocket of the person carrying the accelerometer.

In a seventh aspect, the invention proposes an apparatus for maintaining the pace of a person moving on foot comprising: a storage unit containing an indication of the desired pace, a pace detection unit for detecting the pace of the person, a music playback unit for playing music to the person, a control unit, wherein if the pace detection unit detects that the pace of the person is not the same as the indication of the desired pace, the pace detection unit indicates to the control unit, such that the control unit causes the music playback unit to play music of another tempo until the pace of the person is that of the desired pace.

Optionally, the music playback unit plays music of another tempo by adjusting the speed in which the music is played. Optionally, the music playback unit plays music of another tempo by selecting another piece of music with a different tempo.

In an eighth aspect, the invention proposes a method of maintaining the pace of a person moving on foot, comprising providing an indication of a desired pace, playing a piece of music having a tempo to the person, monitoring the pace of the person, adjusting the speed in which the music is played until the pace of the person is influenced to correspond to the desired pace.

In a ninth aspect, the invention proposes a method of maintaining the pace of a person moving on foot, comprising providing an indication of a desired pace, playing a piece of music having a tempo to the person, monitoring the pace of the person, changing the music to another piece of music having a different tempo, such that pace of the person is influenced to correspond to the desired pace.

BRIEF DESCRIPTION OF DRAWINGS

Embodiments of the invention will now be described in a non-limitative manner with references to the following figures, in which like numerals refer to like parts, in which.

DETAILED DESCRIPTION

Figure 1:
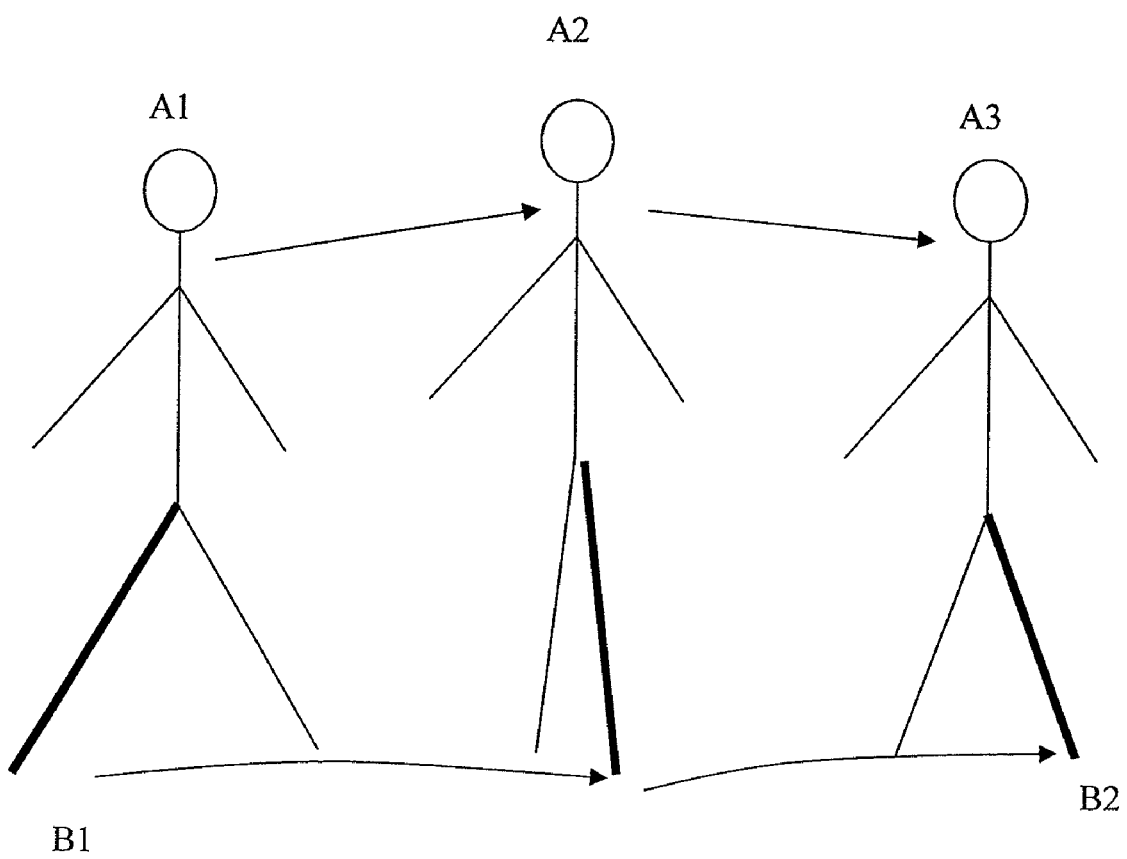
FIG. 1 illustrates the basic movements of a person running or walking.

FIG. 1 illustrates the general physical movements of a person when running (including jogging) or walking in a steady state, i.e. at a relatively uniform speed in horizontal direction. In this state, acceleration is mainly but not completely composed of vertical vector components. When a foot of the person is lifted from position B1 to B2 to make a step, his body rises slightly as it moves from position A1 to A2 and then falls slightly as it moves further to A3. An accelerometer carried by the person would be able to detect the movements of the person's body.

Figure 2:
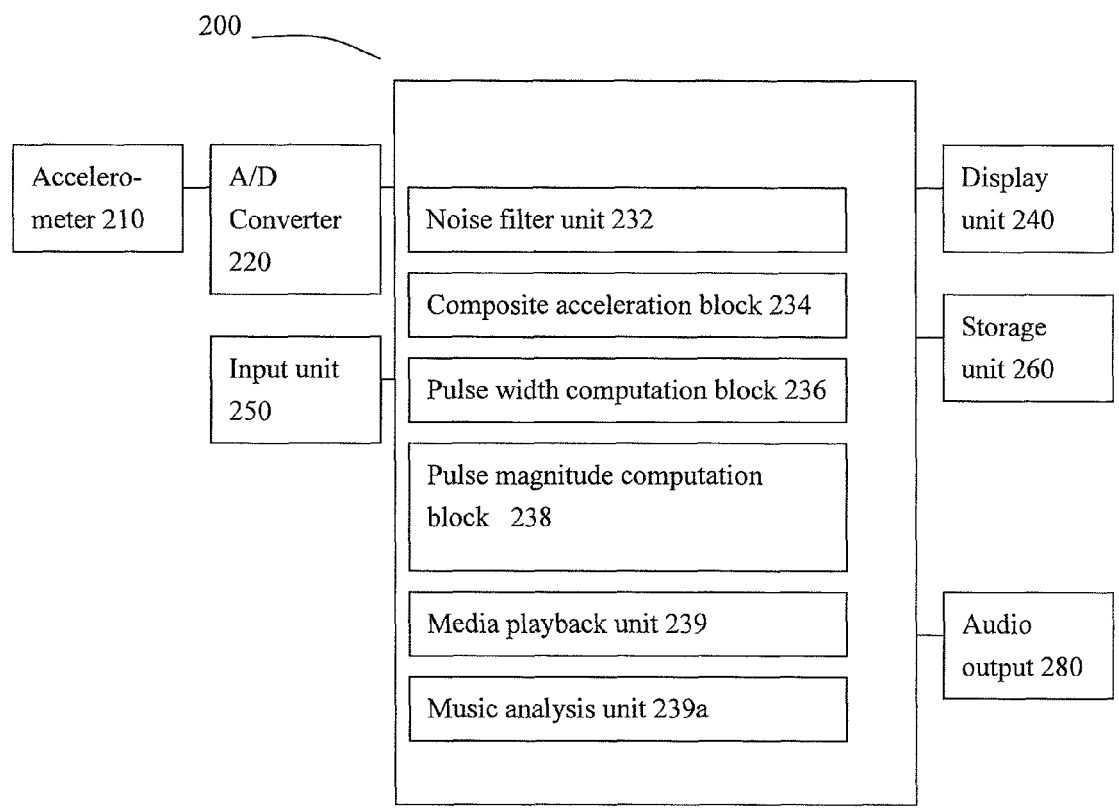
FIG. 2 schematically illustrates an embodiment of the invention.

FIG. 2 illustrates an embodiment of the invention which is a device 200 for measuring the acceleration in these movements, comprising an accelerometer 210, an analog-to-digital (A/D) converter 220, a control unit 230, a display unit 240, an input unit 250, a storage unit 260 and an audio output 280.

Figure 3:
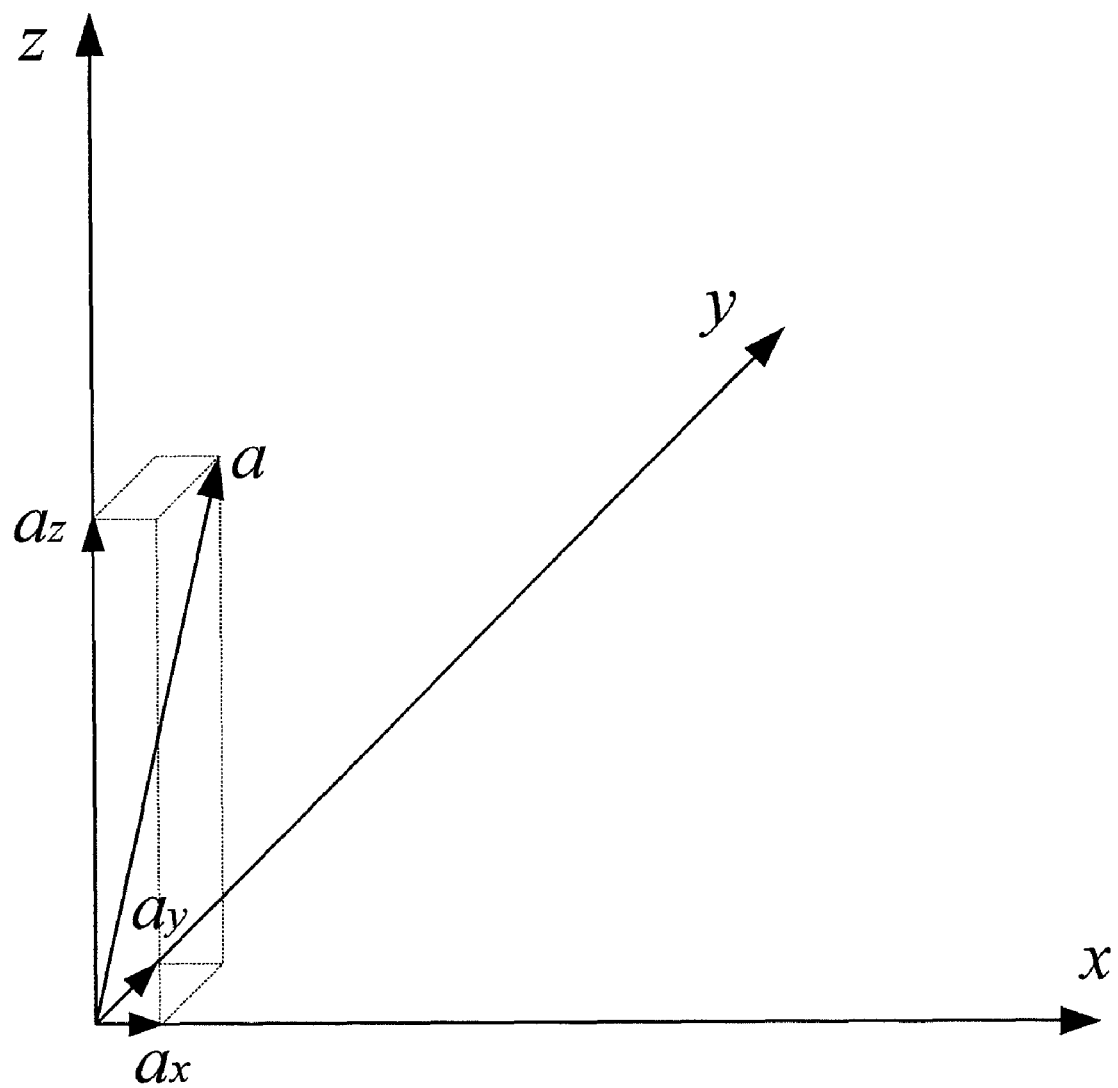
FIG. 3 is representation of acceleration vectors, according to the embodiment of FIG. 2.

The accelerometer 210 typically senses all three components of acceleration in three-dimensional space and provides a corresponding output of three component vectors $a_x$, $a_y$, $a_z$. The magnitude of a composite vector, a, may be calculated from these three component vectors, as illustrated in FIG. 3. Advantageously, as the accelerometer is a 3-axis accelerometer, the accelerometer may be oriented in any direction and is yet able to detect the vertical acceleration vector, unlike a 1-axis accelerometer which has to be aligned vertical to the ground to measure the vertical acceleration vector.

Generally, an accelerometer at rest would continuously sense the ever-present vertical pull of the earth's gravity and output an unadjusted value of 1 g. On the other hand, a freefalling accelerometer does not resist the gravitational pull and would sense an unadjusted 0 g despite the vertical acceleration of the freefall. Sometimes an accelerometer may be configured to adjust its output to reflect a vertical 0 g when the accelerometer is at rest and a vertical 1 g when the accelerometer is freefalling. However, the acceleration values used in this description are not adjusted.

The A/D converter 220 converts the analog output of the accelerometer 210 to digital values before feeding the values to the control unit 230. Typically, the sampling frequency of the A/D conversion may be 125 Hz and the resolution may be 8 bit. A higher sampling frequency and resolution would produce better accuracy. Optionally, the A/D converter 220 is omitted if the accelerometer provides immediate digital output.

The display unit 240 is connected to the control unit 230 to show data such as the count of running steps, walking steps and total steps. Furthermore, the display unit 240 shows data such as the distance traveled by the user of the device 200.

The input unit 250 is connected to the control unit 230 for the user to pre-set exercise parameters or to enter information, which is stored in the storage unit 260.

The control unit 230 includes a noise filtering block 232, a composite acceleration computation block 234, a pulse width computation block 236 and a pulse magnitude computation block 238, a music analysis unit 239 and a media playback unit 239a. The media playback unit is connected to the audio output unit 280 to output music.

Figure 2A:
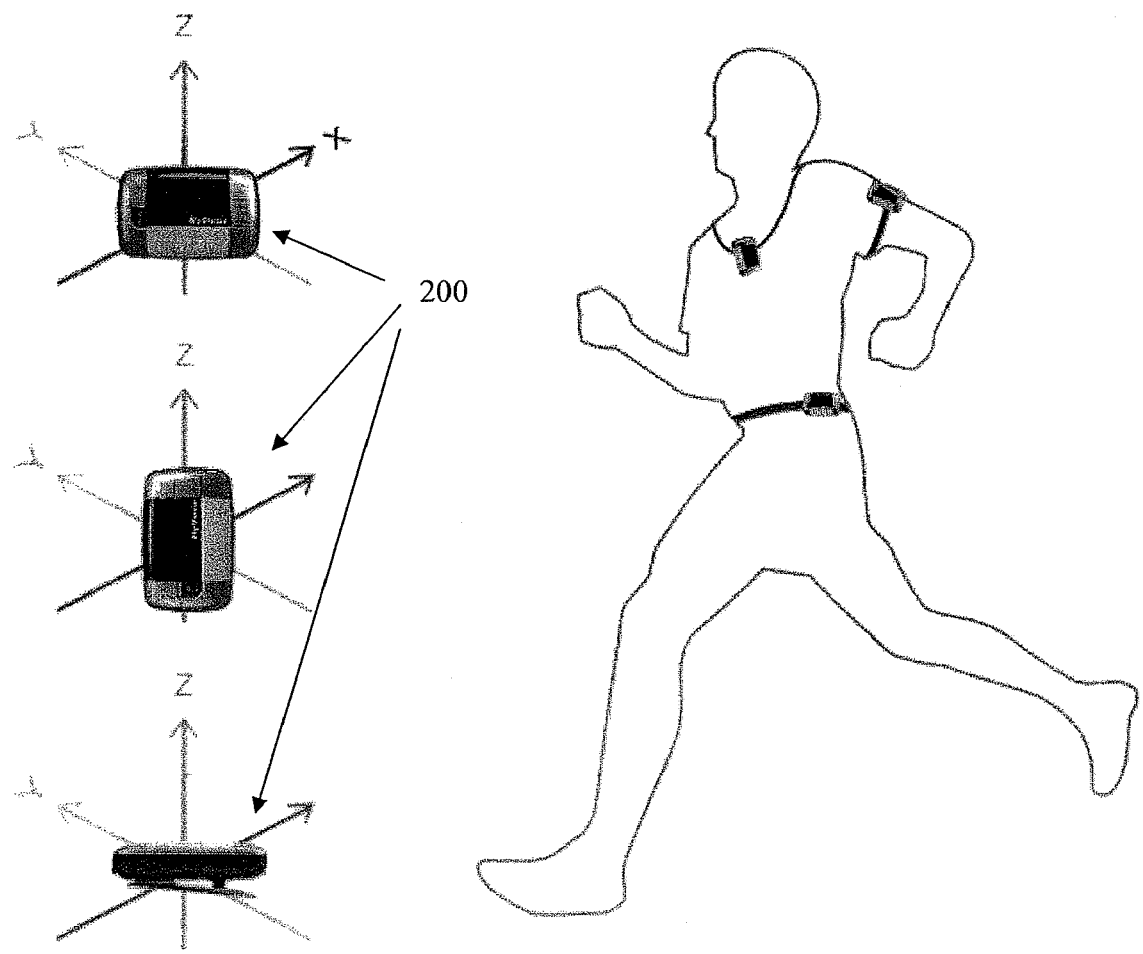
FIG. 2a illustrates how the embodiment of FIG. 2 is used.

In use, a user who wishes to monitor his exercise may carry the device 200 in a pocket or he may attach or strap it to a belt around his trunk. Generally, the device is attached to the person in such a way as to measure the body acceleration as a whole. FIG. 2a illustrates how this may be achieved. The right part of FIG. 2a shows several possible ways the device may be attached to the user, i.e. strapped to his trunk via a belt, or strapped to his neck by a collar or attached with other body parts having negligible relative acceleration with the trunk, such as his biceps. The left part of FIG. 2a shows how the device detects acceleration in three orthogonal directions in 3 dimensional space, and thus the device is able to work regardless of whether the device is worn upright.

Figure 4:
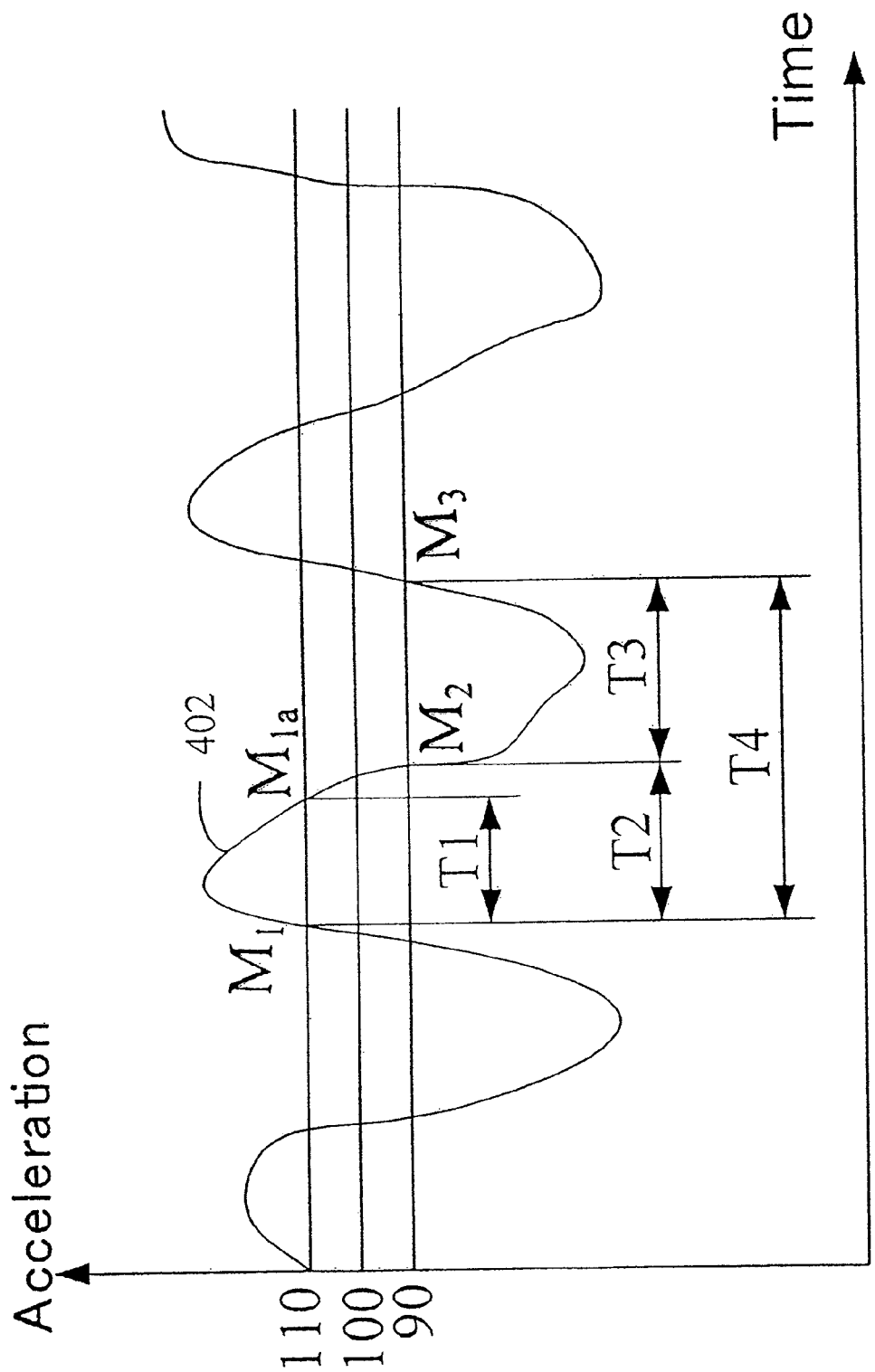
FIG. 4 shows an acceleration curve according to the embodiment of FIG. 2.

The device 200 is thus able to detect the user's body acceleration caused by running and/or walking to count the steps and estimate the distance covered. Within the device 200, the control unit 230 computes the magnitude of the acceleration vector based on the three vector components in three directions, geometrically and according to equation (1), with reference to FIG. 3, $$a = \sqrt{a_x^2 + a_y^2 + a_z^2} \quad (1)$$

wherein
a=magnitude of the composite acceleration
$a_x$=magnitude of the acceleration in x-axis
$a_y$=magnitude of the acceleration in y-axis
$a_z$=magnitude of the acceleration in z-axis FIG. 4 shows an example of a curve 402 which plots the changes in the composite acceleration magnitude (a) of the user carrying the device 200, against time. The curve 402 shows how acceleration fluctuates roughly periodically, the peaks and troughs of the fluctuations corresponding to the steps of the user. The raising of a foot and putting it down creates fluctuations in overall acceleration experienced by the user's body. More specifically, a single step causes the user's body (as indicated in FIG. 1) to have an increase in acceleration followed by a decrease, and then to no acceleration as the body goes up from A1 to A2. Subsequently, acceleration increases again, albeit velocity in the opposite direction, and then decreases and then to no acceleration as the body goes from A2 to A3, to complete the step.

The y-axis of the graph expresses 1 g as a normalized value 100 and hence the curve 402 shows values in the region of 100s where 90=0.9 g and 110=1.1 g. As shown, each step made by the person causes a generally sinusoidal variation in acceleration which has a period identified by T4.

Turning again to FIG. 2, the pulse width computational block 363 is capable of analysing the pulse widths of the curve 402 to identify if any of the peaks is due to false movements, such as when the accelerometer is jerked, and not to the user running or walking. The pulse width computation block 636 checks if the acceleration peaks and troughs have widths T1, T2, T3 and T4 within specific ranges.

A first pulse width T1 is defined as the time during which acceleration values are greater than an upper threshold value i.e. 1.1 g.

A second pulse width T2 is defined starting from where the acceleration value become greater than the upper threshold and ending where the value drops below a lower threshold value of 0.9 g.

A third pulse width T3 is defined as the time during which acceleration values are lesser than the lower threshold value of 0.9 g.

A fourth pulse width T4 is defined as starting from where the acceleration values become greater than the upper threshold value of 1.0 g, to where the values drops to below lower threshold of 0.9 g and then rises up to the lower threshold of 0.9 g.

Optionally, the threshold values shown in FIG. 2 may be adjusted for different people. For example, an elderly person who is slower and gentler may experience acceleration of smaller magnitudes when walking or running.

The pulse widths T1, T2, T3 and T4 in a step taken by any person running or walking are typically within specific ranges, wherein T1 is in the range of 24 ms to 600 ms, T2 is in the range of 80 ms to 700 ms, T3 is in the range of 24 ms to 600 ms and T4 is in the range of 120 ms to 1300 ms. Accordingly, the pulse widths T1, T2, T3 and T4 overlap, as shown in FIG. 4. Although the ranges of T1 to T4 as are specific, the pulse width of any one of T1 to T4 is variable. This is because the acceleration profile for each step is unlikely to be identical to that of the next step. For example, one walking step may have T1=30 ms, T2=60 ms, T3=60 ms and T4=120 ms, and the next walking step of the same person in the same exercise may have T1=40 ms, T2=70 ms, T3=60 ms and T4=130 ms.

If the pulse widths do not fall into the given ranges, the detected acceleration pulse is assumed to be due to motion or impact which is not from the running or walking, such as the accelerometer being jerked, shaken, flung or rolled.

If the pulse widths do fall into the given ranges, the detected acceleration pulse is then assumed to be due to running or walking motions. The control unit 260 then proceeds to determine if the pulse indicates running or walking.

Therefore, the embodiment comprises a method of determining whether a person has made a step comprising providing an accelerometer to monitoring the acceleration profile of a person moving on foot over a period of time $M_1$ to $M_3$, and defining the period by sub-periods wherein a first sub-period is defined from a time $M_1$ to a time $M_{1a}$, wherein $M_1$ is the time when the acceleration value begins to increase from a value of x and $M_{1a}$ is the time when the acceleration value decreases back to the value of x, a second sub-period is defined from the time $M_1$ to a time $M_2$, wherein $M_2$ is the time when the acceleration value decreases further to a value of y, and value x is greater than value y, a third sub-period defined from the time $M_2$ to a time $M_3$, wherein $M_2$ is also the time when the acceleration value decreases from value of y, and wherein $M_3$ is the time when the acceleration increases back to the value of y, and determining that the acceleration profile represents a step if the period $M_1$ to $M_3$ has a duration of 120 to 1300 ms, the first sub-period $M_1$ to $M_{1a}$ has a duration of 24 to 600 ms, the second sub-period $M_1$ to $M_2$ has a duration of 80 to 700 ms, and the third sub-period $M_2$ to a time $M_3$ has a duration of 24 to 600 ms.

Alternatively, the acceleration profile of a step may be distinguished from acceleration caused by other movements, if the direction of the composite acceleration vector is not largely composed of the vertical vector. In this case, the device is configured to detect the direction of the pull of gravity. Subsequently, the direction of the vector of the smallest acceleration magnitude in the acceleration profile is determined. If the direction of the vector of the smallest acceleration magnitude is largely in line with the direction of the gravity pull, then is will be determined that a step has been taken.

As stated before, vertical acceleration dominates in a person's steady state walking or running. Therefore, the acceleration direction during running or walking should be nearly parallel with gravity, as shown in FIG. 11. Furthermore, experiments show that the acceleration direction is closest to the direction of gravity when the magnitude is smallest within the acceleration profile of a step. This occurs when the foot of the user walking or running is falling to the ground, in a step. This is due to the user having the least amount of control on his body at this stage, and the accelerometer mainly senses the gravitational force.

In practice, the direction of gravity pull is determined when the device is at rest. This can be easily achieved by measuring all acceleration magnitudes in three directions, i.e. $a_{x\_g}$, $a_{y\_g}$, $a_{z\_g}$, and obtaining vector $A_g$, which is the direction of gravity and typically has the magnitude value of 1 g:

$$A_g = [a_{x\_g}, a_{y\_g}, a_{z\_g}] \quad (2)$$

Thus, it does not matter that the device is placed in any direction considered upright to the ground.

To reduce measurement error, $a_{x\_g}$, $a_{y\_g}$, $a_{z\_g}$ can be averaged from acceleration values taken over a short period of time, for example, 2 seconds.

Then, $A_m$ is calculated, where $$A_m = [a_{x\_m}, a_{y\_m}, a_{z\_m}],$$

and $A_m$ is the acceleration vector with smallest magnitude in a step.

Then $A_m$, is divided by its magnitude to obtain a vector $A_n = [a_{x\_n}, a_{y\_n}, a_{z\_n}]$ which has a normalized magnitude of 1 g.

Then, the difference vector, $A_d$ is obtained by subtracting the normalized measured acceleration $A_n$ from the gravity vector $A_g$:

$$A_d = A_g - A_n = [a_{x\_g} - a_{x\_m}, a_{y\_g} - a_{y\_m}, a_{z\_g} - a_{z\_m}] \quad (3)$$

Then the magnitude of the difference vector $A_d$ is obtained:

$$\|A_d\| = \sqrt{(a_{x\_g} - a_{x\_m})^2 + (a_{y\_g} - a_{y\_m})^2 + (a_{z\_g} - a_{z\_m})^2} \quad (4)$$

If the magnitude of the difference vector, $\|A_d\|$, is below a threshold, it means that the measured acceleration $A_m$ has almost the same direction as gravity, in which case, the acceleration profile is deemed to be indicative of a step made in walking or running. Otherwise, the acceleration profile is deemed to be due to movements not part of taking a step, and is disregarded by the device. The magnitude of the difference vector, $\|A_d\|$, is generally between 0 g and 2 g. Preferably, a threshold of 0.45 g is used to identify running and walking movements from other movements. An advantage of this method is that all operations of vector used are scalar operations, which is far more efficient to compute, compared to vector operations.

The device 200 is also capable of distinguishing running from walking by measuring the maximum amplitude or peaks of the pulses. This comprises using the pulse amplitude computation block 638 to evaluate the pulse peak. Experiments show that the magnitude of a walking step is usually greater than 0.1 g and lesser than ⅔ g. On the other hand, the acceleration of a running step is usually greater than a ⅔ g. Thus, this is a method of distinguishing running from walking comprising detecting fluctuating accelerations experienced by a person moving on foot, the fluctuating accelerations corresponding to the steps of the person measuring the peaks of the fluctuating acceleration, wherein a peak greater than or equal to a first value and smaller than a second value indicates a step taken in a walk; and a peak greater than or equal to the second value indicates a step taken in a run. Preferably, the first value is greater or equal to 0 g; and the second value is lesser or equal to 1 g. More preferably, the first value is greater or equal to 0.1 g and the second value is greater or equal to ⅔ g.

Alternatively and slightly simpler, moments of freefall which only occurs in running may be used to distinguish running from walking. When a person is running, both his legs leave the ground periodically, at which point he experiences a momentary free fall before one of his feet reaches the ground. This does not happen if the person is merely walking. This free-fall may be indicated by the accelerometer with an output approaching 0 g, such as <0.5 g. Therefore, a step is deem to be made in running if the minimum acceleration magnitude has a moment of <0.5 g and, other wise, in walking. Thus, this is a method of distinguishing running from walking, comprising detecting fluctuating accelerations experienced by a person moving on foot, the fluctuating accelerations corresponding to the steps of the person, identifying of moments of free-fall in the fluctuating accelerations, wherein a free-fall moment any period of fluctuating acceleration indicates a step made in running and any period of fluctuating acceleration having no free-fall moment indicate a step made in walking.

Thus, it is possible to estimating distance covered by a person on foot in a walk comprising providing an accelerometer to monitoring the acceleration profile of a person moving on foot over a period of time, providing the person's stride length in a walk, distinguishing walking steps from running steps in the acceleration profile, counting the number of walking steps in the profile, multiplying the number of walking steps with the person's stride length to obtain the distanced covered by walking in the period of time. Similarly, the person's stride length in a run may be provided and multiplied by the number of running steps to estimate the distance covered by running. Both distances cover by running and walking may be separately estimated and then summed to obtain a more accurate estimate of distance covered on foot in an exercise.

All the above methods of distinguishing running from walking may be used separately or in combination.

Figure 5:
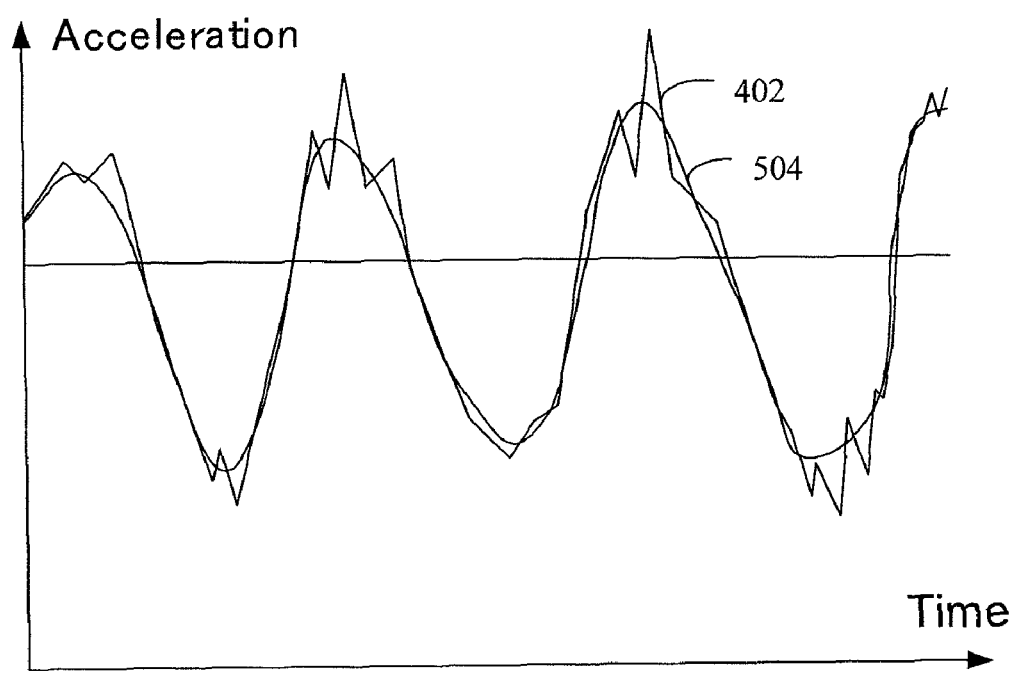
FIG. 5 shows the effect of noise-filtering step in the embodiment of FIG. 2.

The noise filtering block 632 in the controlling unit 230 is used to filter away noise in the acceleration curve. FIG. 5 illustrates how noise is superimposed on the underlying acceleration curve 402 in a practical situation, which may be due to electronic noise, vibrations in the surrounding and so on. Filtering may be achieved by a low pass filter, such as a median-like filter, which may reveal the smoother underlying curve 504.

Figure 6:
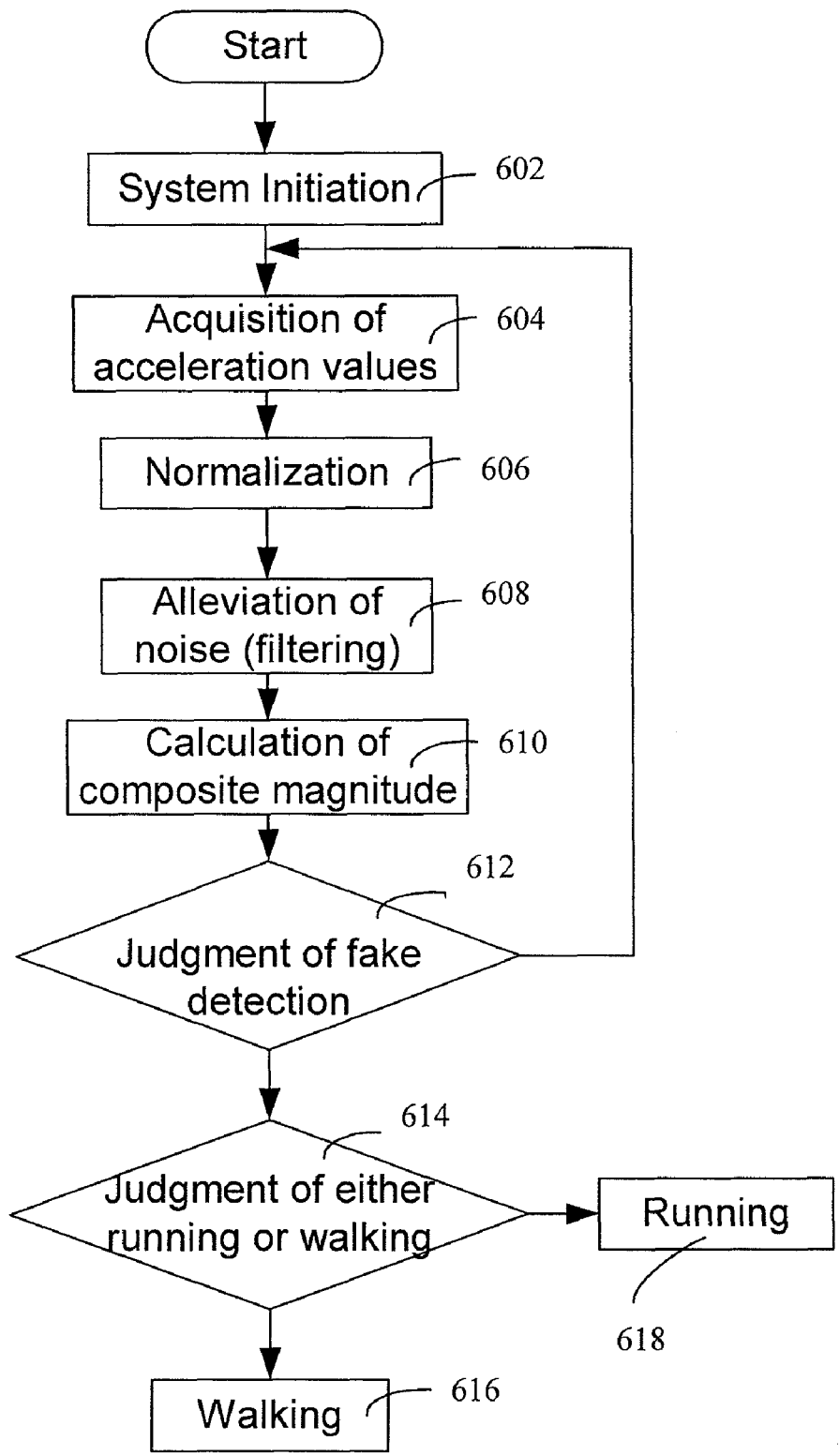
FIG. 6 is a flowchart of calibration steps used in the embodiment of FIG. 2.

FIG. 6 is a flowchart corresponding to a method used in the embodiment of FIG. 2. In the beginning, the device 600 is initialized and related variables are initiated, such as the number of recorded steps being reset to 0 (step 602). Acceleration values are then acquired of all three acceleration vectors (step 604). Then, the acceleration values are then normalized where 1 g is expressed as a 100 (step 606). Any noise in the acceleration values is then filtered away (step 608) and the composite magnitude of acceleration vector is calculated (step 610). Any false moves are then identified and dismissed using the methods discussed above (step 612). If it is determined that acceleration values show that the user is either running or walking, then the next step is to distinguish whether the acceleration values indicates which of running or walking (step 614). If it is determined that the acceleration indicates a walking step, a Walking Counter stored in the storage unit 660 is incremented by 1 (step 616). If it is determined that the acceleration indicates a running step, a Running Counter stored in the storage unit 660 is incremented buy 1s. Preferably, the counters start recording only after a specific time period or after a specific number of steps has been detected to allow the user's pace to stabilize, for example, after 6 steps (step 617).

Figure 7:
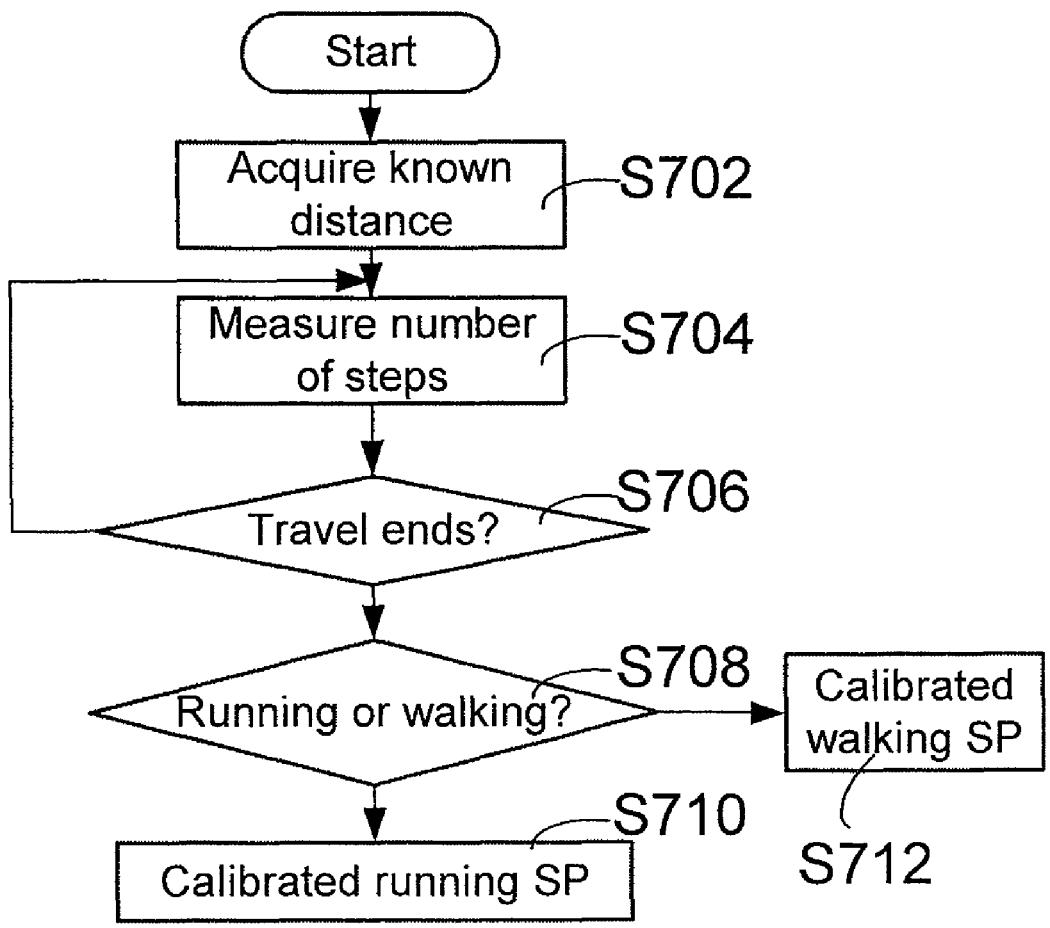
FIG. 7 is flowchart illustrating a method used in the embodiment of FIG. 2.

Optionally, the device 200 may be calibrated according to the flowchart of FIG. 7. Firstly, a calibration distance, such as 200 m, is pre-selected by the user and entered into the device 600 via the input unit 250 and stored into the storage unit 260 (at step 702). At the start of the calibration, the user walks the 200 m while the input unit 250 counts his steps. The user then manually ends the counting via the input unit 250 when he completes the 200 m (at step 706). The control unit 230 then determines if the detected steps were due to the user running or walking using the above described method (at step 708). If it is determined that the user was running, the device computes the running stride length (at step 712) by dividing the calibration distance by the detected number of steps. Any pre-existing record of a running stride in the storage unit 260 is replaced by just computed running stride length. On the other hand, if the user was deemed to be walking, a similar computation is performed but the result would be stored as the user's walking stride length (at step 710). The user's stride length is represented by the length starting from B1 and ending at B2 in FIG. 1.

The calibration allows the device 200 to estimate the distance covered by the user on foot; total distance is the sum of the total running distance and the total walking distance, which are calculated by multiplying the total running steps with the running stride length and multiplying the total walking steps with the walking stride length. Accordingly, the total distance traveled, total running distance and total walking distance may all be calculated. Advantageously, step detection allows moments of rest to be disregarded.

As an alternative, calibration may also be performed in a hybrid manner, i.e. with both running and walking. In this case, the user travels twice the 200 m distance s, and $$s = p_r \cdot m_r + p_w \cdot m_w = p_r \cdot n_r + p_w \cdot n_w \quad (5)$$

where
- $p_r$=stride (pace distance) for running,
- $p_w$=stride for walking,
- $m_r$=total running steps for the first travel,
- $m_w$=total walling steps for the first travel,
- $n_r$=total running steps for the second travel,
- $n_w$=total walking steps for the second travel.

Based on equation (5), the apparatus can measure all $m_r$, $m_w$, $n_r$, $n_w$. With the known s value, both $p_r$ and $p_w$ can be solved to obtain the running stride length and walking stride length.

Figure 8:
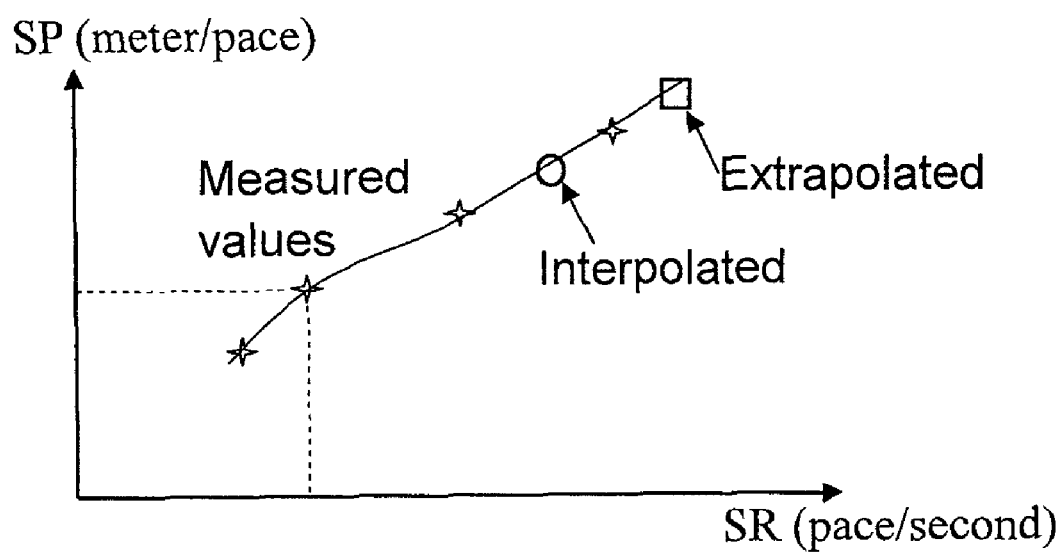
FIG. 8 is a flowchart illustrating the relationship between stride length and step rate, according the embodiment of FIG. 2.

Another method of calibration utilizes the relation between the stride length or step pace (SP) and the steps traveled per unit time or step rate (SR). Experiments show that when a person increases the speed in which he is walking or running, both the stride length and step rate would increase simultaneously, and vice versa. This stride calibration is based on this principle. The user runs or walks a few laps of known but varying distances, and the device 200 records time duration and steps for each lap. For each lap, the exercise may be executed in different speeds, which may be either running or walking. The stride length SP is then obtained by dividing the known distance by the detected number of steps for each lap. The step rate SR is then obtained by dividing the detected number of steps by the time taken for each lap. The relation between stride length SP and step rate SR is then obtained, as illustrated in FIG. 8, by interpolation and/or extrapolation of the scattered data points obtained from the several laps. The interpolation and extrapolation need not be based on a linear model. Second- or multiple order polynomial or spline interpolation/extrapolation models may be used to estimate the SP/SR relationship. The use of mathematical modeling allows satisfactory precision in the SP/SR relationship to be obtained using just a few laps of running or walking for calibration. The resultant SP/SR relation is stored in the storage unit 260 as a lookup table.

Thus, distance covered by a person in an exercise may be estimated using the lookup the table, based on the SR (or, number of steps and time duration). In other words, a corresponding SP may be found by looking up the SP/SR lookup table in the storage unit 260, i.e. measure time and number of steps, obtain SR, obtain SP through the lookup table and then obtain the distance by multiplying SP with the number of steps.

Preferably, the control unit 230 calculates the SR based on the number of steps taken within specific time 'windows'. 260 Then the distance traveled within each specific window is obtained by multiplying the stride length by the number of steps taken within the window.

Optionally, the total distance covered may be obtained accumulatively, by the summation of the distances covered in several windows. The total distance may be displayed in the display unit 240. The period of each window may be constant throughout the exercise, e.g. fixed at 20 seconds, or it may be variable (such as if the device detects frequent/fast change of accelerations, it shortens the time window; when accelerations have almost no change, the time window can be longer.

The media playback means 639, music analysis unit 239a and the audio output 280 are optional features in the device 200. The media playback means 639 allows the user to listen to the music via the audio output 280, which may be an output to small speakers integrated to the device or to headphone or earphones. Optionally, by the music analysis unit 639, the device 200 is able to analysis the tempo of any piece of music and then vary the speed in which the music is played back to adjust the music tempo. As the user is likely to run or walk in pace with the tempo of the music he is listening to, adjusting the music tempo is able to help the user maintain a desired pace, illustrated in FIG. 9.

Figure 9:
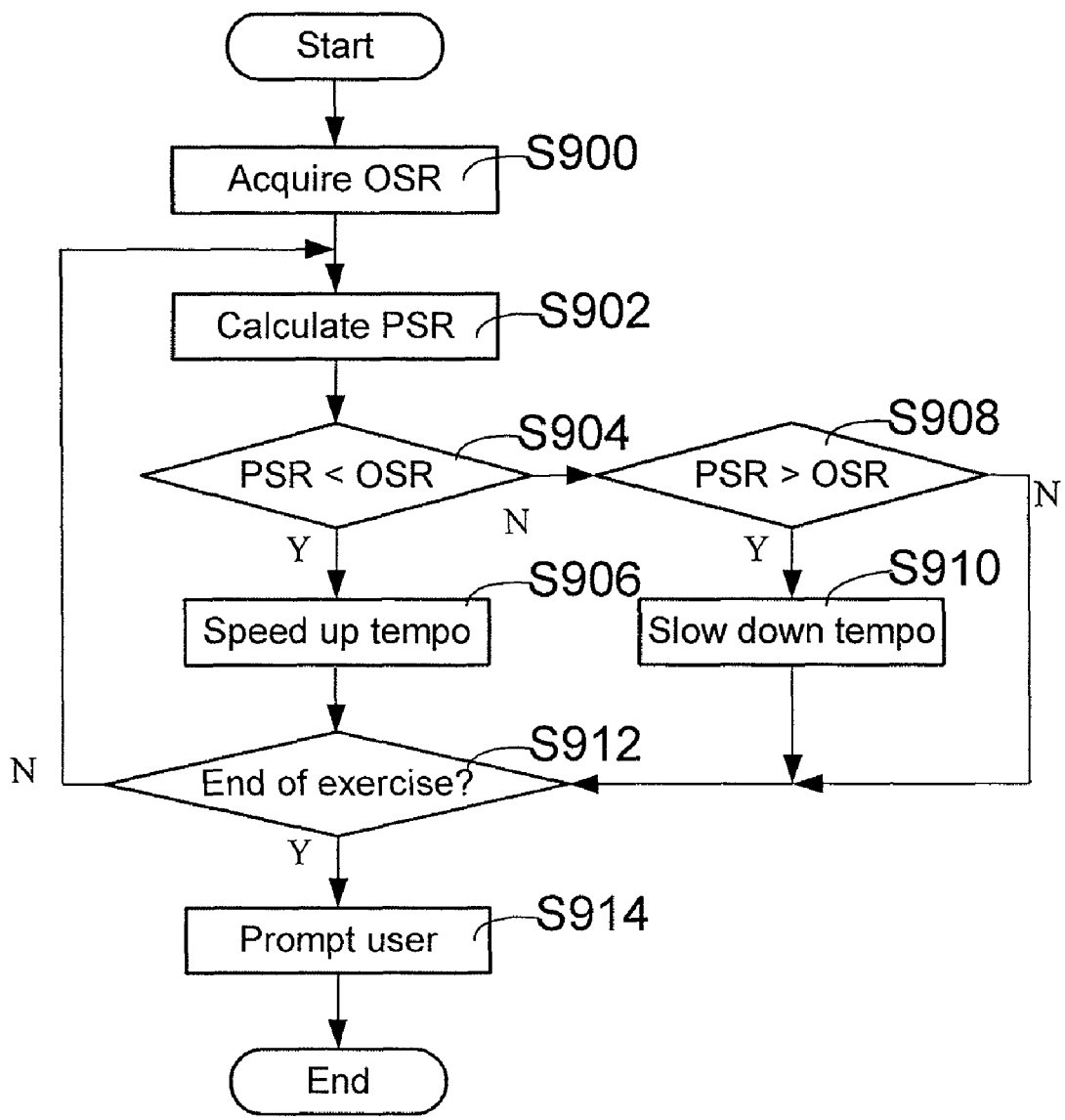
FIG. 9 shows a further feature in the embodiment of FIG. 2.

FIG. 9 shows how the user may set an objective step rate (OSR) profile via the input unit 250 (step 900). The objective step rate (OSR) profile is user's desired pace of the run or walk. The user may also set the desired duration of the exercise or the desired distance into the device 200. Alternatively, different pre-set combinations of OSR profile, duration and/or distance are pre-stored in the storage unit 260 for quick selection.

Figure 10:
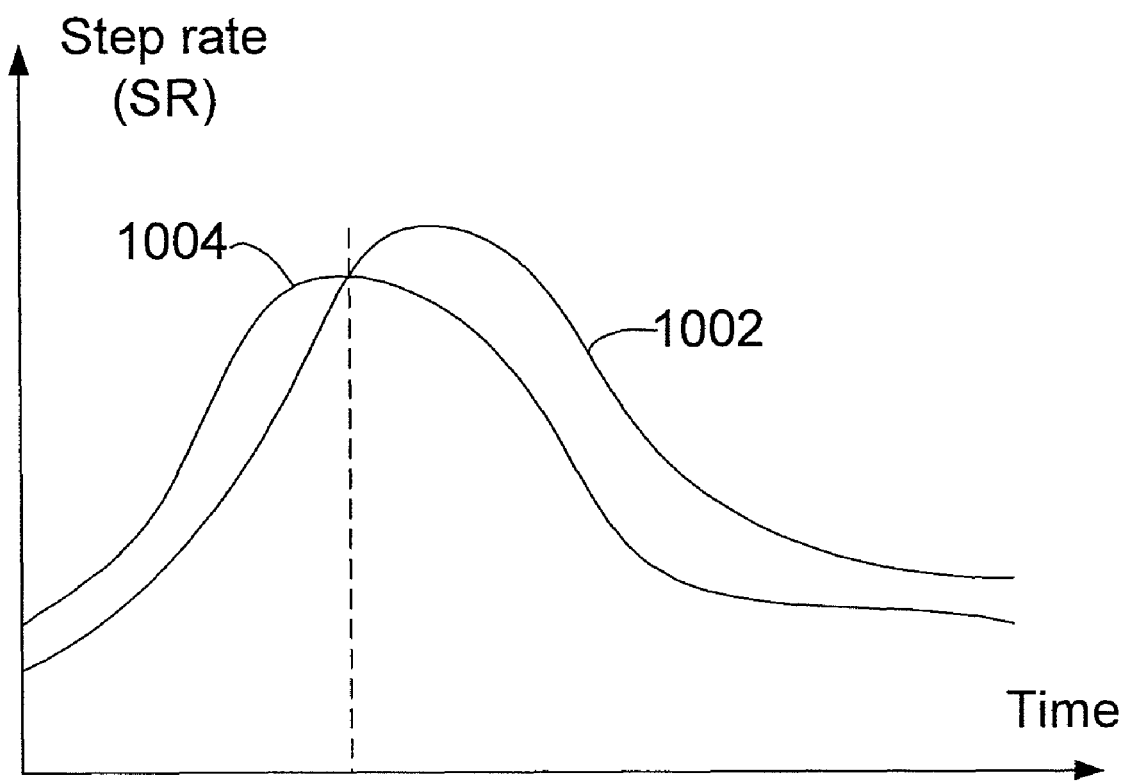
FIG. 10 shows yet a further feature in the embodiment of FIG. 2.

As the user begins to walk or run, the 200 device detects the user's steps and begins to calculate the practical step rate (PSR) (step 902), i.e. the actual step rate of the user in his exercise. Preferably, a period of lead time is provided to allow the PSR to stabilize before the device 200 starts counting the user's steps and pace, e.g. 6 steps. Optionally, the extra distance of the 6 paces may or may not be disregarded in the final calculation of the distance covered. After the lead time has passed, if the acceleration detection shows PSR<OSR (step 904), then the device plays the music faster to speed up the music tempo (step 906). However, if PSR>OSR (904 and 908), the music is slowed down (step 910) to slow down the music tempo. If PSR=OSR generally, the speed of the music is not adjusted. FIG. 10 is a graph showing the relationship of the PSR and OSR profiles 1002, 1004. The dotted line represents the desired pace pre-set by the user. The part of the curve on the left side of the dotted line represents the case of PSR<OSR. In this case, the device 200 adjusts the music playback to speed up. Conversely, the part of the curve on the right side of the dotted line shows PSR>OSR. In this case, the device 200 adjusts the music playback to slow down. Thus, the user listening to the music from the device 200 is drawn to adjust his steps to be in tune with the music tempo and maintain the desired pace. As the playback speed is adjusted, this embodiment is applicable to adjusting the software playback of music files and to adjusting the speed of reading physical CDs, cassettes and so on. In other words, this embodiment is not limited to music files to play music of adjusted tempo.

In the alternative, music files stored in the device may be pre-classified according to the tempo of the unadjusted music, i.e. the standard rate in which the music is to be played back. This may be done by music analysis software in the music analysis unit 239a. When there is a need to adjust the tempo of the music to influence the pace of the user, a piece of music having the suitable tempo is selected and played by the device 200, at the standard speed in which the music is to be played. That is, if PSR<OSR, a file with faster music tempo will be selected and played by the device 200. Furthermore, if PSR>OSR, a file with slower music tempo will be selected and played by the device 200. In this way, all music files are played in the device's standard speed and tempo adjustment comes in the form of the device 200 selecting a suitable music file originally having the desired tempo, instead of adjusting the speed of the playback. This alternative has an advantage in that the music does not play in a different key, and sound lower or higher than intended at recording.

Therefore, the embodiment is also an apparatus for maintaining the pace of a person moving on foot comprising, a storage unit containing an indication of the desired pace, a pace detection unit for detecting the pace of the person, a music playback unit for playing music to the person, a control unit, wherein if the pace detection unit detects that the pace of the person is not the same as the indication of the desired pace, the pace detection unit indicates to the control unit, such that the control unit causes the music playback unit to play music of another tempo until the pace of the person is that of the desired pace.

As the user progress in his exercise, the device 200 regularly checks if the pre-set time duration or the distance (step 912) has been reached. If so, the device 200 prompts the user that the exercise routine has been completed (step 914). If not, the device continues to monitor the pace, duration and/or distance of the exercise (step 902).

Although the invention has been described with reference to the preferred embodiments, it is noted that equivalents may be employed and substitutions made herein without departing from the scope of the invention as recited in the claims.

The invention claimed is:

1. A method of distinguishing running from walking, comprising:
attaching an accelerometer to a person, wherein the accelerometer is a three-axis accelerometer sensing accelerations along each of three orthogonal axes so that the accelerometer is operative regardless of whether the accelerometer is upright when attached to the person;
detecting, with the accelerometer, fluctuating whole-body accelerations experienced by the body of the person when moving on foot, wherein
fluctuating accelerations within the whole-body accelerations detected by the accelerometer correspond to walking by the person, and
free-fall movements of the body of the person within the fluctuating whole-body accelerations detected by the accelerometer correspond to running by the person; and
determining whether the fluctuating whole-body accelerations comprise a free-fall movement of the body of the person, thereby distinguishing running by the person from walking by the person.

2. The method as claimed in claim 1 wherein
the free-fall movement of the body of the person is indicated by a fluctuating whole-body acceleration detected by the accelerometer of less than 0.5 g,
0 g is a free-fall movement, and
g is gravitational acceleration.

3. The method as claimed in claim 1 wherein
the free-fall movement is indicated by a composite acceleration magnitude detected by the accelerometer and approaching 0 g,
0 g is a free-fall moment, and
g is gravitational acceleration.

4. The method of as claimed in claim 1, further comprising measuring peaks of the fluctuating whole-body acceleration detected by the accelerometer to distinguish running from walking, wherein
a peak in a range from at least 0.1 g to no more than ⅔ g indicates walking,
a peak greater than ⅔ g indicates running, and
g is gravitational acceleration.

5. The method as claimed in claim 1 including adjusting the accelerometer to output a 0 g acceleration value in a free-fall so that a free-fall movement of the body of the person is indicated by a fluctuating whole-body acceleration of less than 0.5 g, wherein g is gravitational acceleration.

\* \* \* \* \*